No. 818,876. PATENTED APR. 24, 1906.
W. P. DORRIS.
STALK CUTTER.
APPLICATION FILED FEB. 5, 1906.
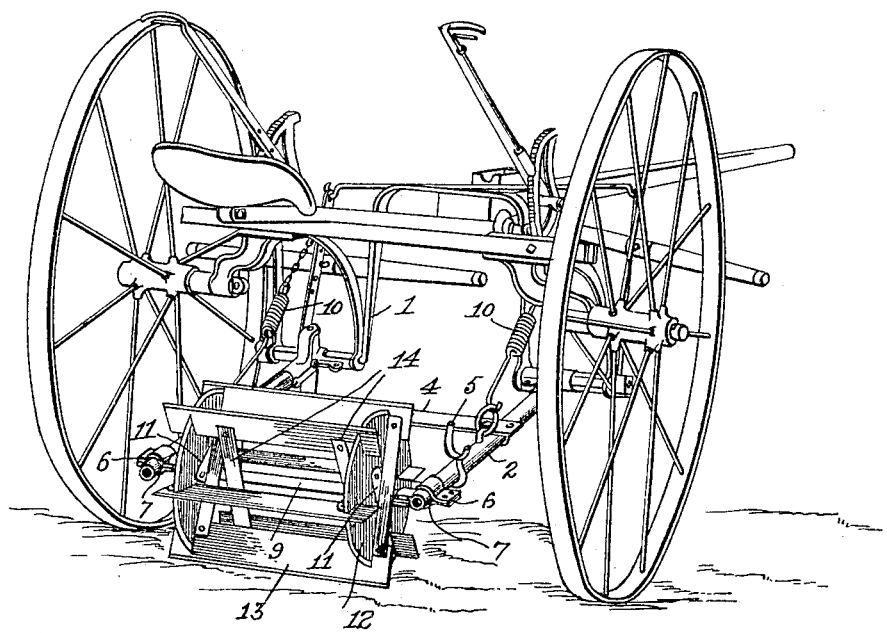
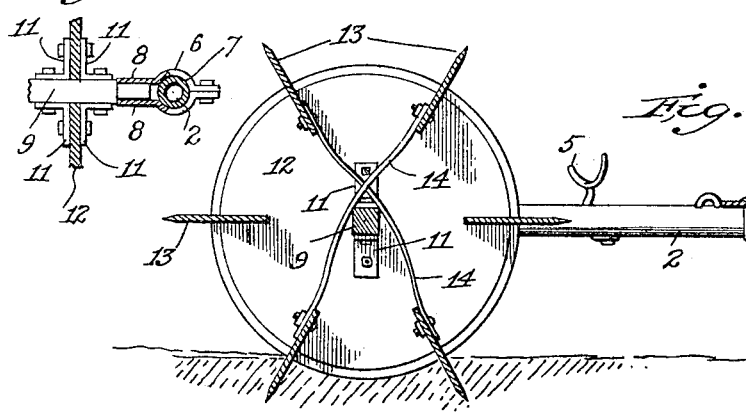
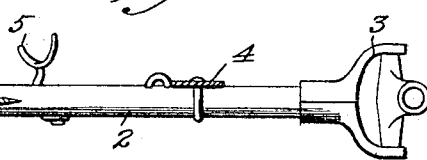
Witnesses
Edwin L. Yewell
A. M. Bunn
Inventor
William P. Dorris
By R. W. Bishop
Attorney

UNITED STATES PATENT OFFICE.

WILLIAM P. DORRIS, OF MORO, TEXAS.

STALK-CUTTER.

No. 818,876.  Specification of Letters Patent.  Patented April 24, 1906.

Application filed February 5, 1906. Serial No. 299,468.

*To all whom it may concern:*

Be it known that I, WILLIAM P. DORRIS, a citizen of the United States of America, residing at Moro, in the county of Taylor and State of Texas, have invented certain new and useful Improvements in Stalk-Cutters, of which the following is such a full, clear, and exact description as will enable others skilled in the art to which the invention appertains to make and use the same, reference being had to the accompanying drawings, forming a part hereof.

This invention relates to improvements in stalk-cutters, and has for its object the provision of a simple and efficient attachment for cultivators and harrows by the use of which all stalks and vines in a field to be cultivated may be quickly and thoroughly cut down. This object is attained by the use of the device illustrated in the accompanying drawings; and the invention consists in certain novel features of the same, as will be hereinafter first fully described and then particularly pointed out in the claim.

In the drawings, Figure 1 is a perspective view of a cultivator-frame having my stalk-cutter connected thereto. Fig. 2 is an enlarged longitudinal section of the stalk-cutter, and Fig. 3 is an enlarged view of the longitudinally-movable box for the stalk-cutter axle.

The cultivator-frame may be of any desired dimensions and is provided with the usual arched axle 1, to which the attachment is secured. In carrying out my invention I employ a pair of longitudinal beams 2, the front ends of which are forked, as shown at 3, to fit over and receive suitable bolts, by which they are secured to the arched axle. Near their front ends the beams 2 are connected by a cross-bar 4, so as to impart the necessary rigidity to the device, and near their rear ends suitable foot-recesses 5 are provided. Upon the rear ends of the beams are mounted boxes 6, in which the ends of the axle of the stalk-cutter are journaled. These boxes 6 consist of plates or straps provided with semicircular recesses or grooves 7 to fit around the beam and having their outer ends bolted together. The inner ends of the straps are formed with half-sockets 8, to receive the cylindrical ends of the cutter-axle 9, and the said socketed ends of the plates are likewise bolted together, so as to inclose and hold the said axle. By this construction I am enabled to adjust the bearings 6 along the beams 2 and secure them at any desirable point upon the beams. The bolts are first loosened, after which the bearings are shifted along the beams, and then the bolts are again tightened, as will be readily understood. This adjustability affords a simple means of varying the depth to which the cutters will enter the ground, as the beams 2 will necessarily drop rearwardly from the arched axle through their own weight, and consequently if the cutter is shifted forwardly along the beams it will not enter the ground to the same extent as if it were closer the rear ends of the beams. In order that the weight of the beams may not rest entirely upon the cutter, and consequently force the same too heavily upon the ground, I employ supporting-springs 10, which extend between the upper part of the arched axle 1 and the beams, as shown and as will be understood. The front ends of the beams are attached to the arched axle, so as to permit a vertical play of the beams, and these springs serve to cushion the return of the beams after the cutter has passed over stones or other obstructions, so as to prevent injury to the cutter-blades through a forcible drop of the same to the ground.

Secured upon the axle 9 near the ends of the same by means of suitable brackets or boxes 11 are disks 12, having beveled or sharp edges and provided with a series of radial notches in their edges. Fitted in the said radial notches and extending between the disks are blades 13, provided with sharpened outer edges and connected in pairs by straps 14, which have their opposite ends bolted to the diametrically opposite blades, as shown clearly in the drawings. The straps 14 are so disposed as to prevent longitudinal movement of the blades by coming into contact with the disks or rotary cutters. The construction described and shown permits the blades to be quickly removed for repairs or sharpening, as it is necessary only to disconnect the straps from the blades and then bodily lift the blades from the recesses in the disks.

The operation of the device will be readily understood. The cultivator or harrow is driven over the field and the blades 13 all engage the ground, so as to cause the cutter to rotate, the said blades taking into the ground so as to cut through the stalks and vines which may be in their path. The blades 13, of course, will only act upon the vines and stalks which are disposed longitudinally upon the travel of the machine; but the transversely-disposed stalks will be cut up by the disks or rotary cutters, so that all the stalks or vines upon the ground will be cut down. The machine is very simple and obviously will not clog, as the construction is open and presents no small angles or recesses in which the vines may be caught and held. The ease with which the blades may be removed from the disks permits the cutting edges to be sharpened without great loss of time or the expense of providing a new attachment.

Having thus described my invention, what I claim, and desire to secure by Letters Patent, is—

A stalk-cutter comprising a pair of rotary cutters having radial recesses in their edges, blades fitted in said recesses and extending between the rotary cutters and straps having their opposite ends detachably secured to the diametrically opposite blades and arranged adjacent to the rotary cutters.

In testimony whereof I have signed this specification in the presence of two subscribing witnesses.

WILLIAM P. DORRIS.

Witnesses:
THOMAS J. DORRIS,
WILLIAM B. LEWIS.